United States Patent
Hedge

[15] 3,668,267
[45] June 6, 1972

[54] SEPARATION OF 2,7-DIMETHYLNAPHTHALENE FROM 2,6-DIMETHYLNAPHTHALENE WITH MOLECULAR SIEVES

[72] Inventor: John A. Hedge, Wilmington, Del.

[73] Assignee: Sun Oil Company, Philadelphia, Pa.

[22] Filed: Jan. 30, 1970

[21] Appl. No.: 7,273

[52] U.S. Cl. ...................260/674 SA, 208/310, 260/675
[51] Int. Cl. ..........................................C07c 7/12
[58] Field of Search ................260/674 SA, 675; 208/310

[56] References Cited

UNITED STATES PATENTS

| | | | |
|---|---|---|---|
| 3,114,782 | 12/1963 | Fleck et al. | 260/674 |
| 3,133,126 | 5/1964 | Fleck et al. | 260/674 |
| 2,967,896 | 1/1961 | Fleck et al. | 260/675 |
| 2,882,244 | 4/1959 | Milton | 252/455 |
| 3,216,789 | 11/1965 | Breck et al. | 252/455 |
| 3,130,007 | 4/1964 | Breck | 252/455 |

Primary Examiner—Delbert E. Gantz
Assistant Examiner—C. E. Spresser
Attorney—George L. Church, Donald R. Johnson, Wilmer E. McCorquodale, Jr. and Barry A. Bisson

[57] ABSTRACT

Two structurally similar polycyclic compounds can be separated by contacting a fluid feed mixture containing said compounds with a partially dehydrated molecular sieve zeolite, the ratio Al/Si of the zeolite being in the range of 0.65–0.2. The polycyclic compounds can be heterocyclic or carbocyclic. For example, selective adsorption of 2,7-dimethylnaphthalene from a dimethylnaphthalene concentrate is obtained with sodium Type Y molecular sieves. 2,6-Dimethylnaphthalene can then be crystallized from the unadsorbed raffinate fraction. Separation factors of 6 to 8 are obtained, indicating the unexpected high selectivity of these particular molecular sieves for this adsorption (especially compared to Type X zeolite).

A continuous method is disclosed for adsorption and desorption of 2,7-dimethylnaphthalene utilizing Type Y zeolite. Type L zeolite can be used for adsorption and desorption of 2,6-DMN.

16 Claims, 6 Drawing Figures

INVENTOR.
JOHN A. HEDGE
BY
Barry A. Bisson
ATTORNEY

FIGURE 5
SEPARATION OF 2,6 DMN AND 2,7 DMN EUTECTIC MIXTURE, TOLUENE DESORBENT, OPERATING TEMP. 90°C

FIGURE 6

SEPARATION OF 2,7-DIMETHYLNAPHTHALENE FROM 2,6-DIMETHYLNAPHTHALENE WITH MOLECULAR SIEVES

BACKGROUND OF THE INVENTION

Molecular sieves have been used to separate distinct classes of organic compounds and have also been used to separate compounds within a given class. The separation of n-paraffins from branched paraffins with 5A molecular sieves is well known. Selective adsorption of aromatics from mixed streams with 10X and 13X sieves is also known. The use of 10X molecular sieves to separate mixtures of aromatics has been disclosed in U.S. Pat. Nos. 3,114,782 issued Dec. 17, 1963 to Fleck et al. and 3,133,126 issued May 12, 1964 to Fleck et al. These patents disclose separations of mixtures of monocyclic aromatics and separation of mixtures of dicyclic aromatics.

Dimethylnaphthalene concentrate contains significant amounts of 2,6-dimethylnaphthalene bound in a binary eutectic with 2,7-dimethylnaphthalene. This eutectic cannot be broken by distillation or solvent crystallization. With 10X zeolite, a separation factor of 2.7 has been disclosed by Fleck et al. for separation of 2,6-DMN from 2,7-DMN.

2,6-Dimethylnaphthalene (2,6-DMN) and 2,7-dimethylnaphthalene (2,7-DMN) are too close boiling (262.0° C for 2,6-DMN and 262.3° C for 2,7-DMN) to allow separation via fractional distillation. Furthermore, both isomers are solid at room temperature (m.p. 111°–112° C for 2,6-DMN and 96°–97 C for 2,7-DMN). Therefore, only a small fraction of the naturally occuring 2,6-DMN in a refinery stream can be crystallized before a binary eutectic containing 42 percent 2,6-DMN and 58 percent 2,7-DMN begins to precipitate.

BRIEF DESCRIPTION OF THE INVENTION

Good separations of mixtures of aromatic compounds of similar structure can be achieved, by preferential adsorption of one component of the mixture, utilizing an adsorbent comprising a crystalline alumino-silicate zeolite having a critical pore diameter greater than about 6A° preferably 6.5 to 15A°, and wherein the chemical formula of the zeolite can be expressed as $M_x(AlO_2)_x(SiO_2)_y \cdot (H_2O)_z$, where X, Y and Z are integers, the ratio X:Y being from 0.65 to 0.2 and where M represents sufficient cations (including $H^+$) of metals, metal oxides or metal hydroxides to balance the electronegativity associated with the alumino-silicate framework of the zeolite.

A commercially attractive method for separation of the eutectic mixture of 2,7-dimethylnaphthalene (2,7-DMN) and 2,6-dimethylnaphthalene (2,6-DMN) can be achieved by using the present invention. Selective adsorption of 2,7-dimethylnaphthalene from a dimethylnaphthalene concentrate is obtained with sodium Type Y molecular sieves. 2,6-Dimethylnaphthalene can then be crystallized from the unadsorbed raffinate fraction. Separation factors of 6 to 8 can be obtained indicating the unexpected high selectivity of these particular molecular sieves (which have an Al/Si atomic ratio in the range of 0.65–0.35, typically 0.4) for this adsorption (especially compared to Type X zeolite).

A continuous method is disclosed for adsorption and desorption of 2,7-dimethylnaphthalene utilizing Type Y zeolites. Type L zeolites, which have an Al/Si ratio in the range of 0.35–0.2), can be used for adsorption and desorption of 2,6-DMN.

Compared with 10-X zeolite, Na-Y zeolite has been discovered to have greatly improved selectivity for 2,7-DMN adsorption. A second unexpected discovery is that a much sharper separation is obtained when a mixed refinery stream containing liquid DMN isomers is utilized instead of a pure binary mixture. Another unexpected discovery is that careful control of water content of the sieve allows improved selectivity.

Figure 5:
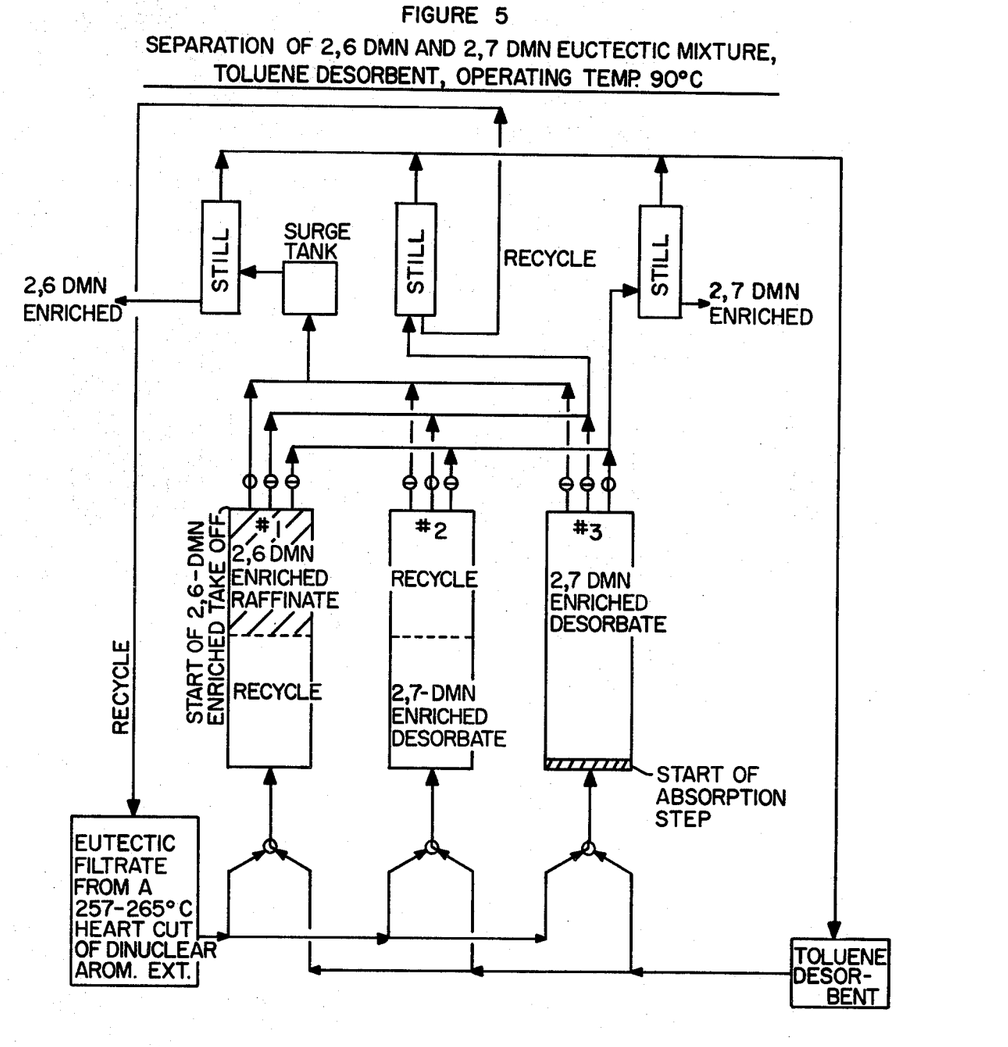
FIG. 5 is a schematic diagram of a process wherein a selective adsorbent is used for separation of an eutectic mixture of 2,6-DMN and 2,7-DMN (which can be present in admixture with other DMN isomers) into a fraction enriched in 2,6-DMN and a fraction enriched in 2,7-DMN.

By syncronizing the operation of the 3 columns, 2,6-DMN enriched streams can be produced in a continuous manner. In effect, at any given point in time, one column will be eluting raffinate which is rich in 2,6-DMN, one column will be eluting a recycle stream, and one column will be eluting a desorbate which is rich in 2,7-DMN.

Feed to this unit consists of eutectic filtrate from a 257°–265° C. heart-cut of dinuclear aromatic extract. As shown in FIG. 5, this feed is being pumped to column 3. Simultaneously, toluene desorbent is being pumped to columns 1 and 2.

Take off of product from column 1 is 2,6-DMN enriched raffinate. This raffinate, stripped of toluene desorbent, is ready for crystallization of 2,6-DMN.

Take off from column 2 is recycle material, which is stripped of desorbent and recycled to the dinuclear aromatic charge tank.

Take off from column 3 is 2,7-DMN enriched desorbate. This desorbate is stripped of tolene desorbent to produce a 2,7-DMN enriched fraction. This enriched fraction is then ready for crystallization to recover 2,7-DMN.

Figure 6:
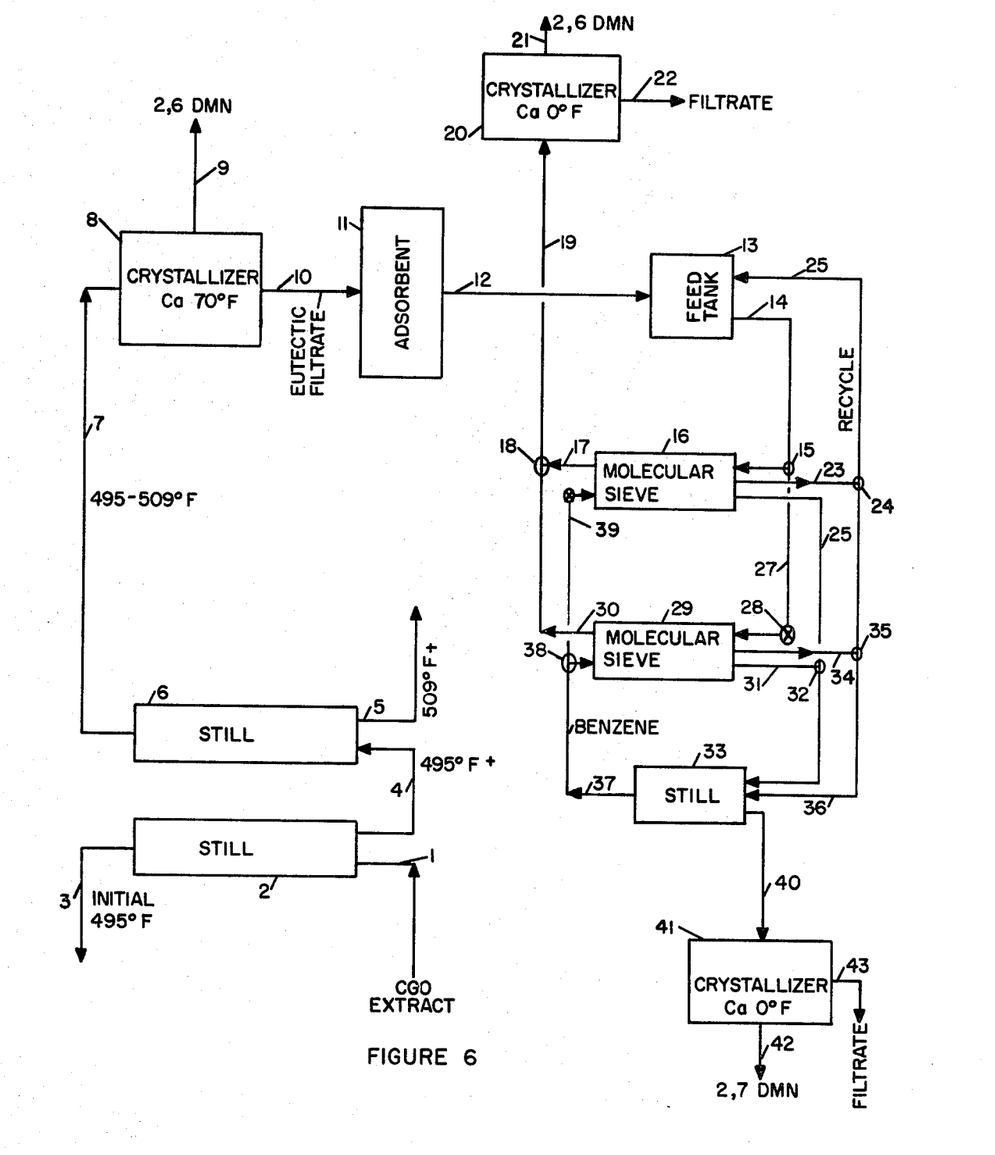

FIG. 6 is a schematic diagram of a process for obtaining substantially pure 2,7-DMN and substantially pure 2,6-DMN from mixtures, such as an aromatic extract from catalytic gas oil, utilizing a molecular sieve adsorbent. This general process can be used for separation of many types of mixtures of polycyclic hydrocarbons and, particularly, can be used to obtain substantially pure 2,6-DMN and 2,7-DMN from a wide variety of hydrocarbon streams (such as the bottoms from "ultrafining" (e.g. severe reforming of high boiling naphtha). Dimethylnaphthalene can also be recovered from the product of demethylation of higher methyl naphthalenes (e.g. trimethyl and tetramethyl naphthalenes) or of streams rich in such naphthalenes.

Other sources of streams containing dimethylnaphthalenes (and which can be used in the present process) are those of U.S. Pat. No. 3,481,996, issued Dec. 2, 1969 to Merritt C. Kirk, Jr.; and the other references cited therein.

Among the sources of OHA mixed with OHP are those described in copending application, Ser. No. 749,932, filed Aug. 5, 1968, of Bushick and Hirschler (and the other references cited therein), now U.S. Pat. No. 3,565,964, issued Feb. 23, 1971.

In FIG. 6, catalytic gas oil extract is distilled in stills 2 and 6 to produce a 495°–509° F. boiling range heart-cut of dimethyl-naphthalene (DMN). This heart-cut is fed to crystallizer 8 (at about 70° F.) where "free" 2,6-DMN is recovered.

Filtrate from crystallizer 8 is essentially eutectic with the respect to 2,6-DMN and 2,7-DMN. The filtrate is passed through an adsorbent bed 11 (e.g. attapulgite clay, bauxite, carbon, etc.) to remove impurities which might damage the molecular sieve adsorbent. The clay-treated eutectic filtrate is fed into feed tank 13 and from there, via line 14, to adsorbent column 16.

Column 16, as illustrated, is at a point of time when it is in the adsorption portion of the cycle. Raffinate leaves column 16 via line 17. This raffinate is passed to crystallizer 20 (at about 0° F.) where 2,6-DMN is crystallized and recovered. Filtrate from crystallizer 20 is usually quite low in 2,6-DMN and 2,7-DMN content and is not normally recycled in the illustrated process.

At this same point in time the benzene desorbent is being pumped to the top of column 29 and a 2,7-DMN rich desorbate fraction is being removed via line 31. This desorbate fraction is stripped of benzene in still 33 and transported via line 40 to crystallizer 41. 2,7-DMN is crystallized (at about 0° C.) from this fraction. The filtrate, removed via line 43, is usually low in 2,7-DMN and is not normally recycled.

ILLUSTRATIVE EXAMPLES

EXAMPLE 1

Several molecular sieves were tested for the separation of 2,6-DMN from 2,7-DMN in the presence of liquid isomers present in a 257°–265° C. heart-cut of an aromatic extract of catalytic gas oil. This heart-cut contains:

12.5% 2,6-DMN (free 2,6-DMN removed)
16.9% 2,7-DMN
43.1% Other DMN's
6.3% 1-and 2-Ethylnaphthalenes
0.5% Biphenyl
20.7% Saturates and monocyclic aromatics Prior to evaluation each sieve was carefully conditioned in moist air (about 125° C.) to control the water content of the sieve. Batch adsorptions were then run in which 10.0 g. of heart-cut, 2.5 g. iso-octane, and 5.0 g. of sieve were held at 100° C. for 2 hours to insure complete equilibration between the raffinate and the adsorbate. This 100° C. temperature was chosen because runs at ambient temperature were considerably slower in reaching equilibrium. The unadsorbed (raffinate) fraction was then filtered off and the cooled sieve washed with room temperature iso-octane to remove the remainder of the unadsorbed fraction. The adsorbate was removed with refluxing benzene. The results of these evaluations are shown in Table I. These results show that Sodium-Y sieve is the most selective sieve studied for adsorption of 2,7-DMN, as shown by separation factor, $\alpha$. Where $$\alpha = \frac{\text{Percent 2,7-DMN adsorbed} / \text{percent 2,7-DMN unadsorbed}}{\text{Percent 2,6-DMN adsorbed} / \text{percent 2,6-DMN unadsorbed}}$$

Further examination of the data shown in Table I reveals several interesting points. Sieve geometry affects selectivity somewhat as shown by the slight differences between powdered, 20–40 mesh size, and tableted Na-Y sieve. Surprisingly, both basic sodium-Y and ammonium-Y sieves and acidic rare earth-Y sieves show selectivity for 2,7-DMN. A most surprising discovery is that Type L sieve adsorbs 2,6-DMN in preference to 2,7-DMN, the reverse of all other sieves shown in Table I.

TABLE I.—BATCH RUNS, SELECTIVITY OF VARIOUS MOLECULAR SIEVES FOR SEPARATION OF 2,6-DMN AND 2,7-DMN IN PRESENCE OF 257–265° C. HEART-CUT ISOMERS, 100° C., 2 HRS.

| Type of sieve | Sieve pretreatment temperature in air (° C.) | Sieve capacity (g. hydrocarbon/100 g. sieve) | Separation factor, $\alpha$ |
| --- | --- | --- | --- |
| Sodium form, Type Y, powder (SK-40) | 125 | 16.6 | 8.0 |
| Sodium form, Type Y, 20–40 mesh [2] | 125 | 11.4 | 7.3 |
| Sodium form, Type Y, tablet | 125 | 15.0 | 6.5 |
| Ammonium form, Type Y, powder | 125 | 13.2 | 5.8 |
| Rare earth exchanged, Type Y, pellet (SK-500) | 125 | 11.8 | 4.7 |
| Sodium form, Type Y, 1/16" extrudate | 125 | 13.6 | 4.4 |
| Linde 13-X 14 x 30 mesh | 125 | 9.2 | 2.8 |
| Linde 10-X 1/16" extrudate | 100 | 6.6 | 2.4 |
| Potassium form, Type L (SK-45) | 125 | 11.4 | [1] −1.9 |
| Cerium form, Type Y, powder [3] | 230 | 21.6 | 5.6 |

[1] 2,6-DMN preferentially adsorbed.
[2] 1/16" extrudate ground to 20–40 mesh.
[3] Prepared from NH4H exchanged NaY which was then exchanged with cerium nitrate, washed, dryed and calcined at 390° C. before pretreatment in air (see United States Serial No. 716,190, filed March 26, 1968, of Kirsch et al. for details of exchange and calcination).

EXAMPLE II

Figure 1:
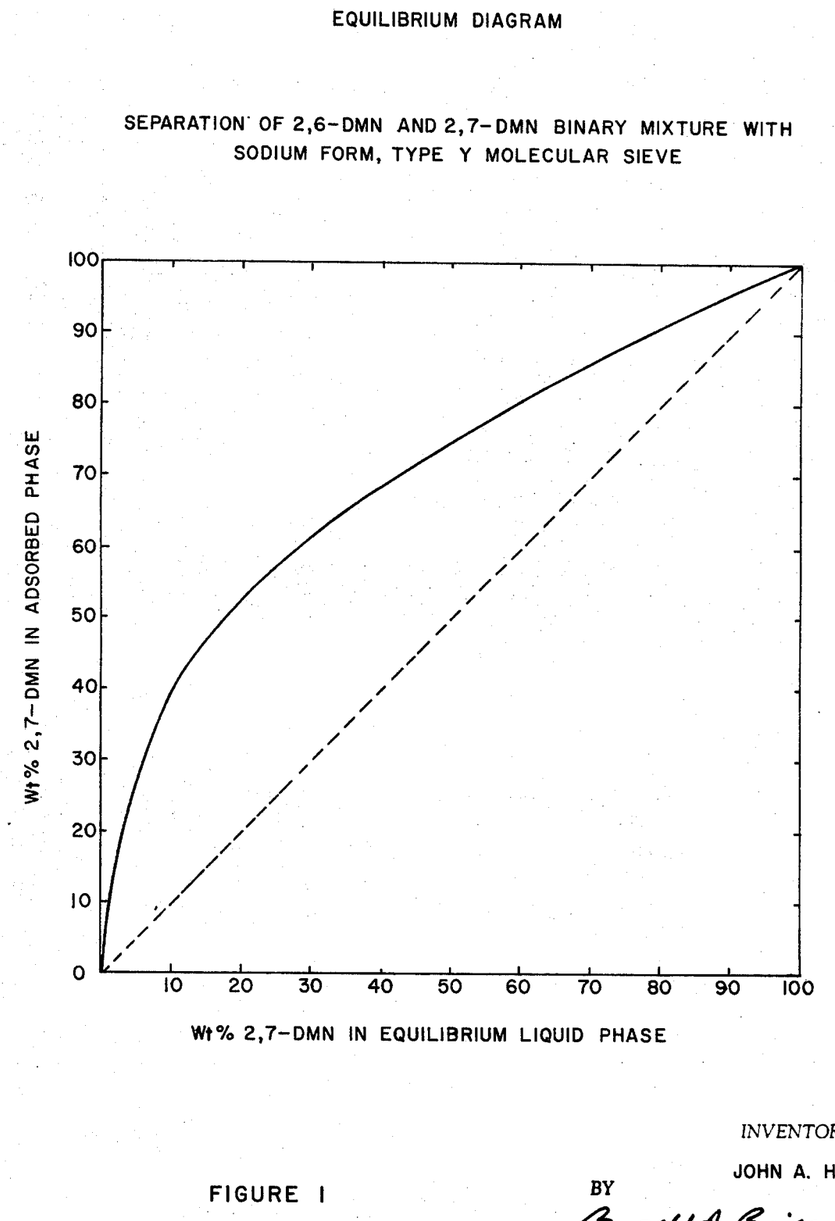
FIG. 1 is an equilibrium diagram, the solid curve of which shows the degree to which 2,7-DMN can be removed from its binary eutectic with 2,6-DMN. The broken line is drawn at a 45° angle for comparison.
Figure 2:
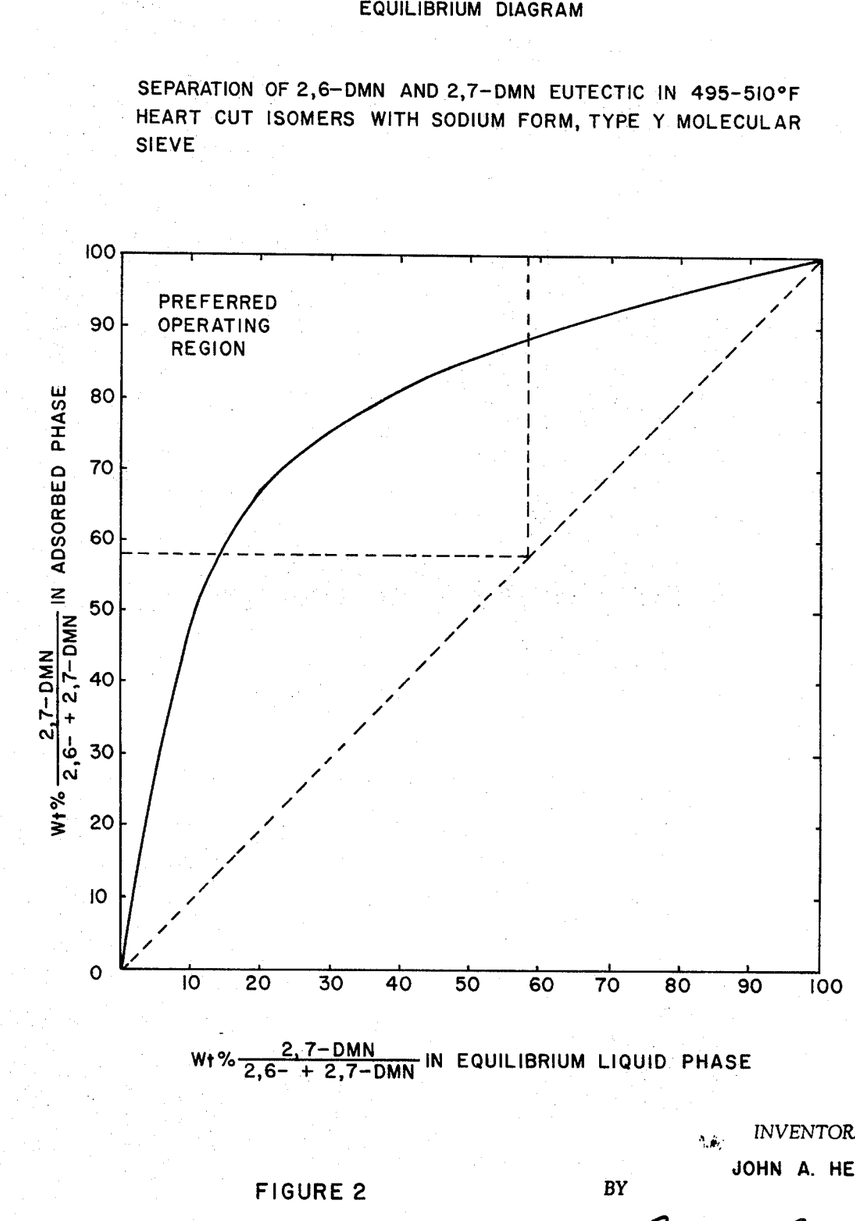
FIG. 2 is an equilibrium diagram which shows the degree to which 2,7-DMN can be removed from a "heart-cut" distillate fraction from an aromatic extract obtained by furfural extraction of catalytic gas oil.

Intuitively, one would predict that separation of a binary mixture should be simpler than separation of two components present in a complex mixture. Surprisingly, as shown in Table II, a much higher separation factor is obtained with a mixed stream than with a binary eutectic. Despite the dilution of 2,7-DMN present in adsorbate by liquid isomers, the weight 2,7-DMN freed per 100g. sieve drops only slightly. This enhanced separation is further illustrated by the equilibrium diagrams for the binary eutectic (FIG. 1) and for the heart-cut mixture (FIG. 2).

TABLE II.—BATCH RUNS, COMPARISON OF PURIFIED BINARY EUTECTIC VS. 257–265° C. HEART-CUT MIXTURE, 100° C., 2 HRS.

| Charge stock | Type of sieve | Adsorbed phase, percent | | Separation factor, $\alpha$ | Wt. 2,7-DMN freed/100 g. sieve |
| --- | --- | --- | --- | --- | --- |
| | | 2,6-DMN | 2,7-DMN | | |
| Purified eutectic | Sodium form, type Y, powder | 23.7 | 76.3 | 3.1 | 5.8 |
| Heart-cut mixture | do | 4.4 | 38.0 | 8.0 | 5.2 |
| Purified eutectic | Sodium form, type Y, tablet | 28.8 | 71.2 | 2.8 | 4.8 |
| Heart-cut mixture | do | 4.8 | 37.0 | 6.8 | 4.4 |

EXAMPLE III

Control of water content of the molecular sieve adsorbent is quite important. An optimum H2O content of 12.0 percent for Na-Y sieve is shown in Table III. This water content was determined by weight loss on ignition at 1,900° F. Sieves having lower water contents are less selective. This finding implies that water present in sieves is structural and does affect sieve properties. Sieves with high water contents, up to 25 wt.%, have reduced capacity for dinuclear aromatics. Sieves wet with methanol have greatly reduced selectivity; conditioning of methanol-wet sieves in moist air at 125° C. restores original selectivity.

In continuous commercial scale operation over long time periods the water content of the zeolite may become less than optimum (due to water removal, as will the desorbate). Therefore, samples of the zeolite adsorbent should be analyzed from time to time and the moisture content of the bed adjusted (as by steam injection or by passing moist air through the bed or by adding controlled amounts of water to the feed stock and/or desorbent). In the event that the water content of the bed is greater than optimum, dry air or a hot dry hydrocarbon can be passed through the bed. If the sieve capacity or selectivity is caused to decrease due to adsorbtion of impurities in the feed or desorbent, the sieve can be regenerated by calcining or burning, followed by moist air to adjust the water content.

TABLE III.—BATCH RUNS, EFFECT OF WATER CONTENT ON MOLECULAR SIEVE SELECTIVITY IN ADSORPTION OF 2,7-DMN FROM 257-265° C. HEART-CUT ISOMERS, 100° C., 2 HRS.

| Type of sieve | Sieve pretreatment temperature in air (° C.) | Wt. percent H₂O[1] | Sieve capacity (g./100 g. sieve) | Separation factor, α |
|---|---|---|---|---|
| Sodium form type Y, powder | 125 | 12.00 | 16.6 | 8.0 |
| Do | 400 | 2.30 | 20.6 | 3.2 |
| Sodium form, Type Y, tablet | 25 | 23.34 | 4.4 | 4.1 |
| Do | 125 | 12.13 | 15.0 | 6.5 |
| Do | 175 | 6.00 | 21.2 | 5.2 |
| Do | (²) | 10.02 | 15.0 | 3.5 |

[1] Based on weight of conditioned sieve.
[2] Methanol washed.

EXAMPLE IV

To develop a cyclic separation process a suitable desorbent must be found. A suitable desorbent must allow selective adsorption and yet must desorb at a reasonable rate. In this example, three aromatic desorbents were evaluated: benzene, toluene, and o-xylene.

Batch competition experiments with equal weights of desorbent and DMN heart-cut were run to determine the effect of desorbent on selectivity for adsorption of 2,7-DMN over 2,6-DMN. The relative strength with which desorbent or any other component of a mixture is adsorbed can be shown by β factor. β factor is defined as the ratio of component $x$ in the adsorbed phase over component phase over component $x$ in the unadsorbed phase divided by wt. 2,6-DMN adsorbed over wt. 2,6-DMN unadsorbed. The β factor for 2,7-DMN is equal to α, as defined earlier.

$$\beta \text{ factor for component } X = \frac{\text{Wt. X adsorbed}/\text{Wt. X unadsorbed}}{\text{Wt. 2,6-DMN adsorbed}/\text{Wt. 2,6-DMN unadsorbed}}$$

The results of competition studies are shown in Table IV. The most selective adsorption of 2,7-DMN occurs in the presence of o-xylene, the most weakly adsorbed desorbent. The least selective adsorption occurs in the presence of benzene, the most strongly adsorbed desorbent. It is quite interesting to see that other DMN isomers are adsorbed more strongly than 2,6-DMN. This may explain why the higher separation factors were obtained with the heart-cut mixture.

TABLE IV.—COMPETITION OF BENZENE, TOLUENE, AND O-XYLENE WITH DIMETHYLNAPHTHALENES FOR ADSORPTION ON MOLECULAR SIEVE, β FACTORS OBTAINED FROM BATCH STUDIES (β factor 2,6-DMN chosen equal to 1.0)

| | Benzene | Toluene | o-Xylene |
|---|---|---|---|
| 2,7-DMN | 2.7 | 4.7 | 8.0 |
| Other DMN's | 2.0 | 2.2 | 2.3 |
| Benzene | 1.8 | | |
| 1,6-DMN | 1.4 | | 1.9 |
| 1- and 2-ethylnaphthalenes | 1.7 | 1.8 | 1.8 |
| 2,6-DMN | 1.0 | 1.0 | 1.0 |
| Toluene | | 0.9 | |
| o-Xylene | | | 0.7 |
| Mixed monocyclic aromatics | 0.6 | 0.6 | 0.6 |

These batch competition studies show that benzene caused the fastest desorption while o-xylene would allow the sharpest separation. In view of this dilemma, all three desorbents were investigated in column studies.

EXAMPLE V

The experimental apparatus used for column studies consisted of three-quarter in. I.D. by 36 in. glass column filled with Na-Y sieve containing about 12 wt. % water (by ignition analysis). At the start of each run the column is filled with desorbent. The DMN heart-cut containing eutectic 2,6-DMN and 2,7-DMN is pumped into the bottom of the column. At the end of this DMN charge, desorbent is pumped into the bottom of the column. The desorbent pushes out a 2,6-DMN enriched raffinate and desorbs the 2,7-DMN enriched adsorbate. When the last of the adsorbate is removed from the bottom portion of the sieve bed, the column is ready for a new cycle. The incoming DMN feed pushes out the remainder of the 2,7-DMN enriched desorbate. The effluent from the column was taken in small cuts for the initial studies. These cuts were then analyzed by gas chromatography.

The adsorbent column is held at a temperature just below the boiling point of the desorbent in order to speed diffusion into the sieve particles.

The column runs showed that, as in the batch study, benzene is the most efficient stripping solvent. o-Xylene was quite slow to desorb 2,7-DMN and is not preferred in any industrial scale cyclic process.

Figure 3:
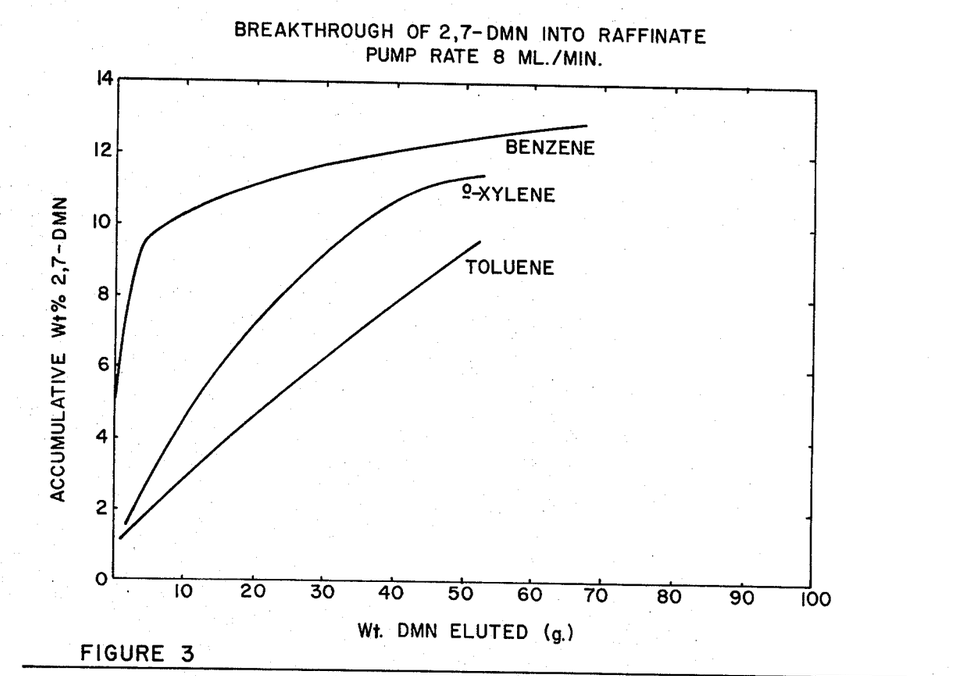
FIGS. 3 and 4 show the "break through" of 2,7-DMN into raffinate (at pump rates of 8 ml./min. and 4 ml./min., respectively) for three desorbents (benzene, ortho-xylene and toluene).
Figure 4:
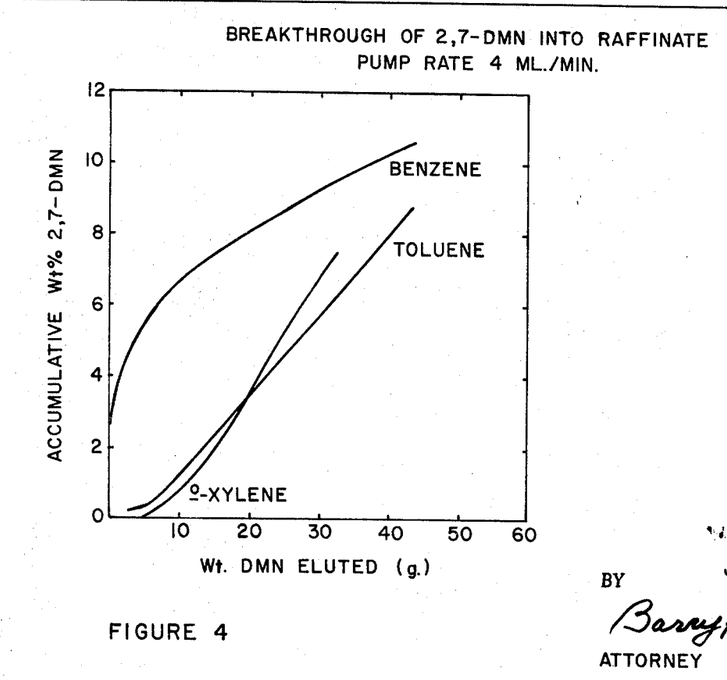

Sharpness of separation is shown by plotting the breakthrough curve of 2,7-DMN into the raffinate. Breakthrough curves for these three desorbents are shown in FIG. 3. Benzene allows a rapid breakthrough of 2,7-DMN. Surprisingly, toluene is superior to o-xylene at the 8.0 ml/min pump rate shown in FIG. 3. At a slower 4.0 ml/min pump rate the curves for toluene and o-xylene are superimposable (FIG. 4). Toluene allows faster equilbration than o-xylene and thus toluene is superior at higher flow rates. Therefore, toluene is the preferred desorbent for a commercial scale separation process.

EXAMPLE VI

A separation process can be effected using three synchronized molecular sieve columns. At a given point in time one column is eluting 2,6-DMN enriched raffinate, the second column is eluting poorly separated charge to be recycled, and the third column is undergoing desorption of 2,7-DMN enriched adsorbate.

A more efficient, commercial scale process involves the apparatus and techniques used in the Molex process.

Similarly, crystalline alumino-silicate zeolites wherein the atomic ratio Al/Si in the zeolite framework is in the range of 0.65 to 0.2 (e.g., Y and L zeolites) can be used to separate other structurally similar polycyclic hydrocarbons such as octahydroanthracene from octahydrophenanthrene and fluorene from 5,6-benzindan.

EXAMPLE VII 5.0g. of a mixture containing:
69.0 wt.% fluorene
20.7 wt.% 5,6-benzindan
11.3 wt.% other aromatics
was dissolved in 25 ml. iso-octane and the resulting solution was contacted for 2 hrs. at 100° C. with 10.0 g. sodium-Y molecular sieve containing about 12 wt.% water (by ignition analysis). The raffinate fraction (3.51g.) contained 66.0 wt.% fluorene and 24.0 wt.% 5,6-benzindan. The adsorbed fraction (1.49g) was enriched in fluorene (77.5 wt.%) and low in 5,6-benzindan (10.9 percent). The separation factor was 2.60. Since fluorene and 5,6-benzindan form a series of solid solutions, this separation is superior to crystallization.

EXAMPLE VIII 10.0g. of a eutectic mixture of 20 wt.% s-octahydroanthracene (OHA) and 80 wt.% s-octahydrophenanthrene (OHP) was dissolved in 25 ml. iso-octane and the resulting solution was contacted for 2 hours at 100° C. with sodium-Y molecular sieve (containing 12 wt.% water). The raffinate (8.52g.) contained 72.7% OHP and 27.3% OHA. The adsorbate fraction (1.48g. desorbed with refluxing benzene) contained 93.7% OHP and 8.3% OHA. The separation factor was 5.6. Thus, OHP is selectively adsorbed.

EXAMPLE IX 10g. of a mixture of 46.2 wt.% anthracene and 53.8% phenanthrene was dissolved in 50 ml. of iso-octane and 75 ml. of toluene. The resulting solution was contacted with 10g. sodium-Y molecular sieve (containing 12 wt.% water by ignition analysis) for 2 hours at 100° C. The raffinate fraction (9.51g.) was 56.5 percent anthracene and 43.4 percent phenanthrene. The adsorbed fraction (removed by refluxing benzene) was enriched in phenanthrene (74.9 wt.%) and decreased in anthracene (25.1 wt.%). The separation factor was 3.9.

EXAMPLE X 10g. of a mixture of 50 wt.% acenaphthene and 50 wt.% 2,3-dimethylnaphthalene (2,3-DMN) in 10g. iso-octane was contacted with 10g. of sodium-Y molecular sieve (containing 12 percent water by ignition test) for 2 hours at 100° C. The raffinate (8.24g.) contained 49.6 percent acenaphthene and 50.4 percent 2,3-DMN. The adsorbate (1.76g., removed by refluxing benzene) was enriched in acenaphthene (58.8 percent) and decreased in 2,3-DMN (41.2 percent). The separation factor was 1.5.

EXAMPLE XI

This example and Example XII show that separations of mixtures of monocyclic aromatics are relatively poor with sodium-Y molecular sieves as the adsorbent.

A solution of 2.5g. p-xylene and 2.5g. m-xylene in 5.0g. iso-octane was contacted with 10.0g. sodium-Y molecular sieve (containing 12 wt.% water by ignition analysis) for 3 hours at 75° C. p-Xylene was preferrentially adsorbed with a 1.14 separation factor.

It should be noted that 10-X sieves have been reported to adsorb m-xylene in preference to p-xylene (see Example I, R. N. Fleck and C. G. Wright, U.S. Pat. No. 3,114,782, issued Dec. 17, 1963, to Union Oil of California).

EXAMPLE XII

A mixture of 5.0g. benzene and 5.0g. toluene was contacted with sodium-Y molecular sieve (containing 12 wt.% water by ignition analysis) for 1 hour at 62° C. Equilibration was complete at this point. Benzene was adsorbed in preference to toluene, the separation factor being 1.59.

Note that toluene has been reported to be adsorbed on hydrogen Y-zeolite in preference to benzene (P. B. Venuto, E. L. Wu, and V. Cattanach, Preprings, Society of Chemical Industry, London, 1967).

EXAMPLE XII

Structurally similar naphthenic hydrocarbons can be separated by selective adsorption on zeolites wherein the ratio Al/Si of the zeolite framework is in the range of 0.65–0.2 and the critical pore diameter is in the range of 6–15A°.

An eutectic mixture of 2.35g. trans, syn -2- syn -6- dimethyl-decalin and 7.65g. trans, syn -2-syn -7-dimethyl-decalin was contacted with 10.0g. sodium-Y molecular sieve (12 wt.% water) at 100° C. for 2 hours. The raffinate fraction (9.3g.) contained 76.1 percent 2,7-dimethyldecalin and 23.9 percent 2,6- dimethyldecalin. Adsorbate fraction (0.70g.) contained 81.1 percent 2,7-dimethyldecalin and 18.9 percent 2,6dimethyldecalin (separation factor 1.34). It should be noted that the weight of this adsorbate fraction was only 0.7g. or 7g. per 100g. of sieve, which is much lower than the capacity of sodium-Y sieves for dimethylnaphthalenes.

The separation of 2,6-DMN and 2,7-DMN eutectic via trans 2,6-dimethyldecalin crystallization and the properties of eutectic mixtures of trans-syn-2-syn-6 with trans-syn-2-syn-7-dimethyldecalin are disclosed in copending application Ser. No. 779,827, of John A. Hedge, filed Nov. 29, 1968 now U.S. Pat. No. 3,541,175 issued Nov. 17, 1970 The disclosure of Ser. No. 779,827 is hereby incorporated herein by reference.

EXAMPLE XIII

All of the previous examples have been of liquid phase adsorption. Vapor phase adsorption can also be used to separate structurally similar polycyclic hydrocarbons, for example, 2,6-DMN from 2,7-DMN.

11.1g. of sodium-Y sieve (containing 12 wt. $H_2O$) was heated slowly to 300° C., well above the 257°–265° C. boiling range of a dinuclear aromatic extract containing 2,6- and 2,7-DMN's. Water was driven off this sieve (thus, reducing selectivity) until the sieve had a weight loss on ignition (at 1,900° F.) of about 4 percent. Dinuclear extract (4.1g.) was charged to the 300° C. sodium Y-zeolite column in 1.5 min. The unadsorbed fraction (2.6g.) contained 15.8 percent 2,6-DMN and 16.6 percent 2,7-DMN. The adsorbed fraction was removed by flushing with 4 – 10cc. volumes of benzene which were collected and analyzed individually (see Table V). A separation factor of 2.6 was achieved.

TABLE V.—VAPOR PHASE SEPARATION OF 2,6-DMN FROM 2,7-DMN IN PRESENCE OF 257–265° C. HEART-CUT ISOMERS, DESORPTION OF 2,7-DMN ENRICHED ADSORBATE WITH BENZENE AT 300° C.

| Desorbed fractions | Percent 2,6-DMN | Percent 2,7-DMN | Wt. extract recovered (g.) |
|---|---|---|---|
| First 10 cc. benzene | 9.2 | 21.3 | .91 |
| Second 10 cc. benzene | 4.7 | 19.9 | .25 |
| Third 10 cc. benzene | 3.8 | 17.5 | .13 |
| Fourth 10 cc. benzene | 3.3 | 15.6 | .13 |
| Average adsorbed fraction | 7.3 | 20.1 | 1.42 |

The large volume of desorbent required to remove the 2,7-DMN makes vapor phase separation unattractive in comparison with liquid phase separation. However, pressure-sweep cycles (e.g. alternating high and low pressures) can be used (particularly in conjunction with a more polar desorbent, as ammonia or organic amines) to improve the desorption step.

The process disclosed herein can also be used to separate other chemically similar cyclic and polycyclic or heterocyclic), especially oxygenated (e.g., esters, acids, ethers, alcohols), halogenated (e.g., chlorinated), or nitrogenated (e.g., amines, amides, nitro compounds) cyclic and polycyclic compounds. Branched, cyclic olefins, such as terpenes or methyl substituted cyclopentadiene can also be separated by the disclosed process as can alpha-methyl naphthalene from beta-methyl naphthalene.

In general, it is preferred that the cyclic or polycyclic hydrocarbons have a critical diameter (or a substituent group, e.g., methyl, ethyl) no greater than that of the zeolite, although in some cases molecules of larger critical diameter can be separated due to differences in polarity. The preferred polycyclic hydrocarbons contain from 2–6 condensed rings with the total number of ring carbon atoms being in the range of 9–25. The critical pore diameter of a zeolite can be determined by the "plug-gauging," e.g., see U.S. Pat. No. 3,130,006, to Breck, issued Apr. 14, 1958 and Barrer, R. M., Quarterly Review III, 301 (1949).

The invention claimed is:

1. Process for separating two structurally similar polycyclic hydrocarbons, said process comprising:
   A. contacting a fluid feed mixture comprising said polycyclic hydrocarbons with a solid adsorbant comprising a partially dehydrated, substantially crystalline alumino-silicate zeolite having a critical pore diameter greater than about 6A°, the ratio Al/Si of the alumino-silicate framework of the zeolite being in the range of 0.65–0.2, whereby there is obtained a rich adsorbent containing an adsorbate which is richer in one said polycyclic hydrocarbon than was said fluid feed mixture, and a raffinate product which contains less of the one said polycyclic hydrocarbon than did said fluid feed mixture;
   B. separating said raffinate product from said rich adsorbent and,
   C. removing the one said polycyclic hydrocarbon from said rich adsorbent.

2. Process according to claim 1 wherein from 25–100 percent of the electronegativity associated with the alumino-silicate framework of said zeolite is satisfied by cations of metals.

3. Process according to claim 2 wherein said cations of metals comprise one or more of the rare earths, lanthanium, lithium, sodium, potassium, calcium, magnesium, barium or mixtures of two or more such cations.

4. Process according to claim 1 wherein said substantially crystalline alumino-silicate zeolite is at least 50 percent crystalline by X-ray, compared to a fully hydrated pure specimen of said zeolite, and wherein there is a loss of 2–18 weight percent water upon ignition analysis of said zeolite at 1,900° F.

5. Process according to claim 4 wherein said loss of water upon ignition analysis is about 12 weight percent.

6. Process according to claim 1 wherein said fluid mixture is contacted in liquid phase and said two structurally similar polycyclic hydrocarbons are selected from the following pairs: 2,6-Dimethylnaphthalene and 2,7-dimethylnaphthalene; octahydrophenanthrene and octahydroanthracene; anthracene and phenanthrene; and, fluorene and 5,6-benzindan.

7. Process according to claim 6 wherein said ratio Al/Si is in the range of 0.65–0.35 and wherein said critical pore diameter is in the range of 6.5–13A:

8. Process according to claim 7 wherein 2,7-dimethylnaphthalene is separated from 2,6-dimethylnaphthalene by preferrential adsorption of said 2,7-dimethylnaphthalene on a Type Y zeolite.

9. Process according to claim 8 wherein 2,6-dimethylnaphthalene is separated from a heart-cut from catalytic gas oil or from a heart-cut from an aromatic extract of catalytic gas oil.

10. Process wherein 2,6-dimethylnaphthalene is separated from 2,7-dimethylnaphthalene by adsorption of said 2,6-dimethylnaphthalene on a Type L zeolite said process comprising A. contacting a fluid feed mixture comprising said 2,6- and 2,7-dimethylnaphthalenes with a solid adsorbant comprising a partially dehydrated, substantially crystalline alumino-silicate zeolite having a critical pore diameter greater than about 6A°, the ratio Al/Si of the alumino-silicate framework of said zeolite being in the range of 0.35–0.2 whereby there is obtained a rich adsorbent containing an adsorbate which is richer in 2,6-dimethylnaphthalene than was said fluid feed mixture, and a raffinate product which contains less of 2,6-dimethylnaphthalene than did said fluid feed mixture;

B. separating said raffinate product from said rich adsorbent and,

C. removing the 2,6-dimethylnaphthalene from said rich adsorbent.

11. Process according to claim 10 wherein from 25–100 percent of the electronegativity associated with the alumino-silicate framework of said zeolite is satisfied by cations of metals.

12. Process according to claim 10 wherein said cations of metals comprise one or more of the rare earths, lanthanium, lithium, sodium, potassium, calcium, magnesium, barium or mistures of two or more such cations.

13. Process according to claim 10 wherein said substantially-crystalline alumino-silicate zeolite is at least 50 percent crystalline by X-ray, compared to a fully hydrated pure specimen of said zeolite, and wherein there is a loss of 2–18 weight percent water upon ignition analysis of said zeolite at 1,900°F.

14. Process according to claim 13 wherein said loss of water upon ignition analysis is about 12 weight percent.

15. Process according to claim 10 wherein 2,6-dimethylnaphthalene is separated from a heart-cut from catalytic gas oil or from a heart-cut from an aromatic extract of catalytic gas oil.

16. Process according to claim 13 wherein said zeolite comprises the potassium form of Type L zeolite.

* * * * *